US009404564B1

(12) United States Patent
Calvert et al.

(10) Patent No.: US 9,404,564 B1
(45) Date of Patent: Aug. 2, 2016

(54) CONTINUOUSLY VARIABLE TRANSMISSION

(71) Applicant: Caterpillar Inc., Peoria, IL (US)

(72) Inventors: Glen Patrick Calvert, Washington, IL (US); Gaurav Vasudeva, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/702,974

(22) Filed: May 4, 2015

(51) Int. Cl.
*F16H 61/66* (2006.01)
*F16H 47/04* (2006.01)
*F16H 3/72* (2006.01)
*F16H 3/62* (2006.01)
*F16H 37/06* (2006.01)

(52) U.S. Cl.
CPC ............... *F16H 47/04* (2013.01); *F16H 3/62* (2013.01); *F16H 3/72* (2013.01); *F16H 37/065* (2013.01); *F16H 61/66* (2013.01); *F16H 2047/045* (2013.01); *F16H 2200/201* (2013.01)

(58) Field of Classification Search
None
See application file for complete search history.

(56) References Cited

U.S. PATENT DOCUMENTS

| | | | | |
|---|---|---|---|---|
| 5,667,452 A | * | 9/1997 | Coutant | F16H 47/04 475/72 |
| 6,663,525 B1 | * | 12/2003 | McKee | F16H 47/04 475/72 |
| 6,964,627 B2 | | 11/2005 | Ai et al. | |
| 7,588,509 B1 | * | 9/2009 | Marsha | F16H 47/04 475/72 |
| 7,648,437 B2 | | 1/2010 | Raghavan et al. | |
| 7,971,434 B2 | | 7/2011 | Ishizaki et al. | |
| 8,500,587 B2 | | 8/2013 | Du et al. | |
| 2006/0191732 A1 | * | 8/2006 | Lunzman | E02F 9/2235 180/307 |

FOREIGN PATENT DOCUMENTS

| | | |
|---|---|---|
| DE | 102005051014 A1 | 5/2007 |
| EP | 1394441 A2 | 3/2004 |
| WO | 2014041326 A1 | 3/2014 |
| WO | 2014146839 A1 | 9/2014 |

* cited by examiner

*Primary Examiner* — Justin Holmes
(74) *Attorney, Agent, or Firm* — Miller, Matthias & Hull LLP

(57) ABSTRACT

A transmission for a work machine may include a first variator including a first input geared to a transmission input, a first output, and a first displacement. A second variator may include a second input geared to the transmission input, a second output, and a second displacement. The first displacement may be greater than the second displacement. A first planetary gear set may be in mechanical association with the second output, selectively coupled to a ground, and in mechanical association with a first gear. A second planetary gear set may be geared to the transmission input. A third planetary gear set may include a transmission output and may be in mechanical association with the second planetary gear set. A second gear may be in mechanical association with the third planetary gear set and may be in mesh with a third gear that is in mechanical association with the first output. The second gear may be in mesh with the first gear.

20 Claims, 3 Drawing Sheets

US 9,404,564 B1

CONTINUOUSLY VARIABLE TRANSMISSION

TECHNICAL FIELD

The present disclosure relates generally to transmissions for a work machine and, more particularly, to continuously variable transmissions for such a work machine.

BACKGROUND

Many work machines in the earth-moving, construction, and agricultural industries such as, for example, wheel loaders, motor graders, and agricultural tractors, may require high power applications. Generally, for such work machines, a continuously variable transmission with only one variator that includes a hydraulic pump and hydraulic motor is not sufficient for the high power requirements. As an example, one large variator, often times, is not sufficient for such high power applications. A second variator can be added to these transmissions to satisfy the high power requirements. In most cases, the second variator has the same large displacement as the first variator, which inherently requires more space on the work machine. Additionally, the output of the first variator is commonly connected in parallel to the output of the second variator so that the hydraulic pump and hydraulic motor of each variator rotate at the same speed. Traditionally, there is no reduction, however, between the two variators. In some situations, such as during low power applications, the large displacement of the second variator is more than is needed yet the outputs of the two variators remain tied to each other, which may lead to increased losses in the transmission.

U.S. Pat. No. 6,964,627 (the '627 patent) discloses a transmission that includes two planetary gear units and a single variator all connected together such that power can be transferred between an input and an output in a compound-split mode or an output-split mode. In the compound-split mode, the two planetary gear units are joined together at two connections to create two compound member branches and two single member branches. The variator operates a single hydraulic pump and a single hydraulic motor. The '627 patent does not disclose a transmission with two same or different sized variators having their outputs selectively combined.

SUMMARY

In accordance with an aspect of the disclosure, a transmission for a work machine is provided. The transmission may include a first variator including a first input geared to a transmission input, a first output, and a first displacement. A second variator may include a second input geared to the transmission input, a second output, and a second displacement. The first displacement may be greater than the second displacement. A first planetary gear set may be in mechanical association with the second output, selectively coupled to a ground, and in mechanical association with a first gear. A second planetary gear set may be geared to the transmission input. A third planetary gear set may include a transmission output and may be in mechanical association with the second planetary gear set. A second gear may be in mechanical association with the third planetary gear set and may be in mesh with a third gear that is in mechanical association with the first output. The second gear may be in mesh with the first gear.

In accordance with another aspect of the disclosure, a work machine is provided. The work machine may include a transmission input in mechanical association with a prime mover. A first variator may include a first input geared to the transmission input, a first output, and a first displacement. A second variator may include a second input geared to the transmission input, a second output, and a second displacement. The first displacement may be greater than the second displacement. A first planetary gear set may be in mechanical association with the second output, selectively coupled to a ground, and in mechanical association with a first gear. A second planetary gear set may be geared to the transmission input. A third planetary gear set may include a transmission output and may be in mechanical association with the second planetary gear set. A second gear may be in mechanical association with the third planetary gear set and may be in mesh with a third gear that is in mechanical association with the first output. The second gear may be in mesh with the first gear.

In accordance with yet another aspect of the disclosure, a method for matching torque and speed outputs of two different sized variators in a transmission is provided. The method entails providing a first variator including a first input, a first output, and a first displacement. Another step may be providing a second variator including a second input, a second output, and a second displacement that is less than the first displacement. Yet another step may be arranging the first input and the second input to be driven off of a common prime mover. Still another step may be providing a planetary gear set in mechanical association with the second output such that, at a planetary gear set output, the torque output of the second output increases and the speed output of the second output decreases to match the torque and the speed outputs of the first output. A further step may be selectively combining the planetary gear set output with the first output.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

DETAILED DESCRIPTION

Figure 1:
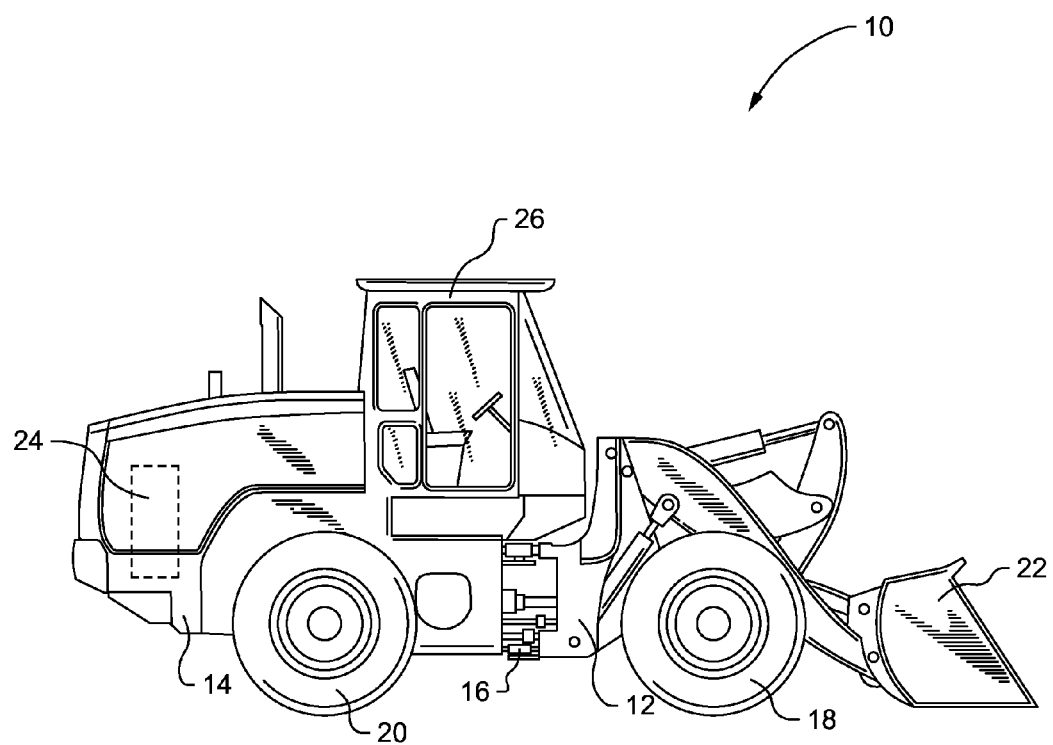
FIG. 1 is a side view of an exemplary work machine, in accordance with the teachings of the present disclosure.

Referring now to FIG. 1, an exemplary work machine constructed in accordance with the present disclosure is generally referred to by reference numeral 10. The work machine 10 may be any type of work machine well known in the earth-moving, construction, and agricultural industries such as, but not limited to, wheel loaders, motor graders, and agricultural tractors. The work machine 10 may include a loader frame 12 and an engine frame 14. The loader frame 12 may be coupled to the engine frame 14 at an articulating joint 16. The loader frame 12 may be supported by a first plurality of ground engaging elements 18 while the engine frame 14 may be supported by a second plurality of ground engaging elements 20. As non-limiting examples, the first and second plurality of ground engaging elements 18, 20 may be tires or tracks. An implement 22 such as, but not limited to, a bucket may be operatively coupled to the loader frame 12. The engine frame 14 may support a prime mover 24 and an elevated cab 26 for an operator. The prime mover 24 may be, but is not limited to, an internal combustion engine, a natural gas engine, a hybrid engine, or any combination thereof. The prime mover 24 may supply power to at least the second plurality of ground engaging elements 20 for propelling the work machine 10.

Figure 2:
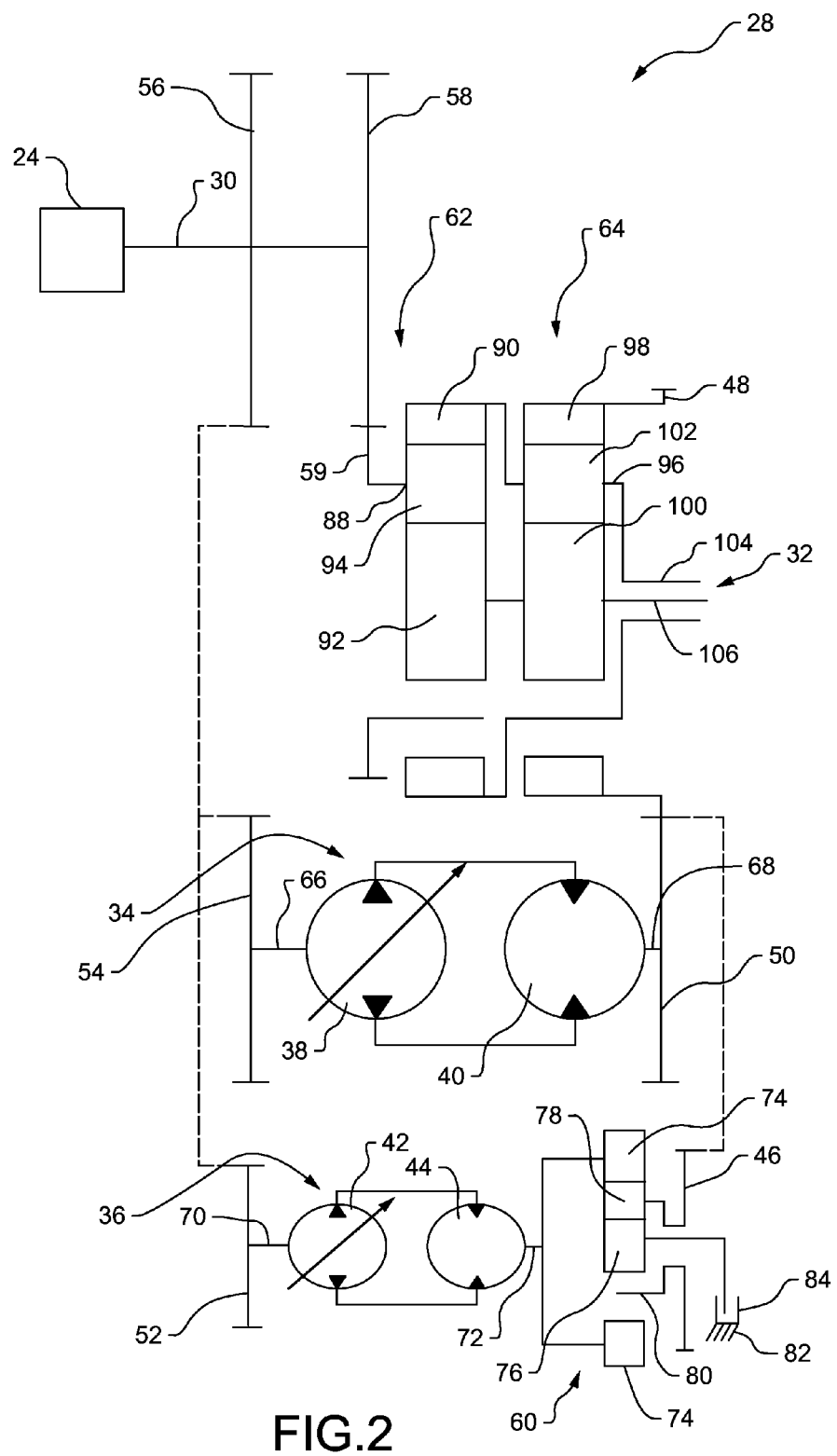
FIG. 2 is a schematic diagram illustrating an exemplary transmission, in accordance with the teachings of the present disclosure.

As best seen in FIG. 2, the work machine 10 may also include a transmission 28. The transmission 28 may be a continuously variable transmission. The transmission 28 includes a transmission input 30, which is mechanically coupled to the prime mover 24, and an output 32. The output 32 may be mechanically coupled to another set or sets of gears and clutches that provide direction and speed range selection for the entire transmission 28. For the sake of clarity, such set or sets of gears and clutches are not depicted in FIG. 2. The transmission 28 also includes a first variator 34 and a second variator 36. The first variator 34 includes a first hydraulic pump 38 mechanically associated with a first hydraulic motor 40. Similarly, the second variator 36 includes a second hydraulic pump 42 mechanically associated with a second hydraulic motor 44. The first and second hydraulic pumps 38, 42 may be variable displacement pumps. The first and second hydraulic motors 40, 44 may be fixed or variable displacement motors. The first variator 34 may have a larger displacement than the second variator 36 such that the volume of the first hydraulic pump 38 is greater than the volume of the second hydraulic pump 42.

The transmission 28 may also include first through eighth gears 46, 48, 50, 52, 54, 56, 58, 59, respectively, and first through third planetary gear sets 60, 62, 64, respectively, although other numbers of gears and gear sets are possible. The transmission input 30 may be mechanically coupled to the sixth and seventh gears 56, 58. The sixth gear 56 may mesh with the fourth gear 52 and the fifth gear 54. The fifth gear 54 may be in mechanical association with the first variator 34 via a first variator input 66 while a first variator output 68 of the first variator 34 may be in mechanical association with the third gear 50. The fourth gear 52 may be in mechanical association with the second variator 36 via a second variator input 70.

The second variator 36 also includes a second variator output 72, which is in mechanical association with a first ring gear 74 of the first planetary gear set 60. Additionally, the first planetary gear set 60 also includes a first sun gear 76 circumscribed by the first ring gear 74, a first at least one planet gear 78 disposed between the first ring gear 74 and the first sun gear 76, and a first carrier 80 coupled to the first at least one planet gear 78. The first carrier 80, as the output of the first planetary gear set 60, may be in mechanical association with the first gear 46. The first sun gear 76 may be selectively coupled to ground 82 via a clutch 84. The first gear 46 may mesh with the second gear 48.

Moreover, the seventh gear 58 may mesh with the eighth gear 59, which is in mechanical association with a second carrier 88 of the second planetary gear set 62. The second planetary gear set 62 also includes a second ring gear 90, a second sun gear 92 circumscribed by the second ring gear 90, and a second at least one planet gear 94 disposed between the second ring gear 90 and the second sun gear 92. The second at least one planet gear 94 may be in mechanical association with the second carrier 88. The second ring gear 90 may be in mechanical association with a third carrier 96 of the third planetary gear set 64. Additionally, the third planetary gear set 64 also includes a third ring gear 98, a third sun gear 100 circumscribed by the third ring gear 98, and a third at least one planet gear 102 disposed between the third ring gear 98 and the third sun gear 100. The third at least one planet gear 102 may be in mechanical association with the third carrier 96. The second sun gear 92 may be in mechanical association with the third sun gear 100. The third ring gear 98 may be in mechanical association with the second gear 48, which may mesh with the third gear 50. A third carrier output 104 and a third sun gear output 106 collectively define the output 32.

Figure 3:
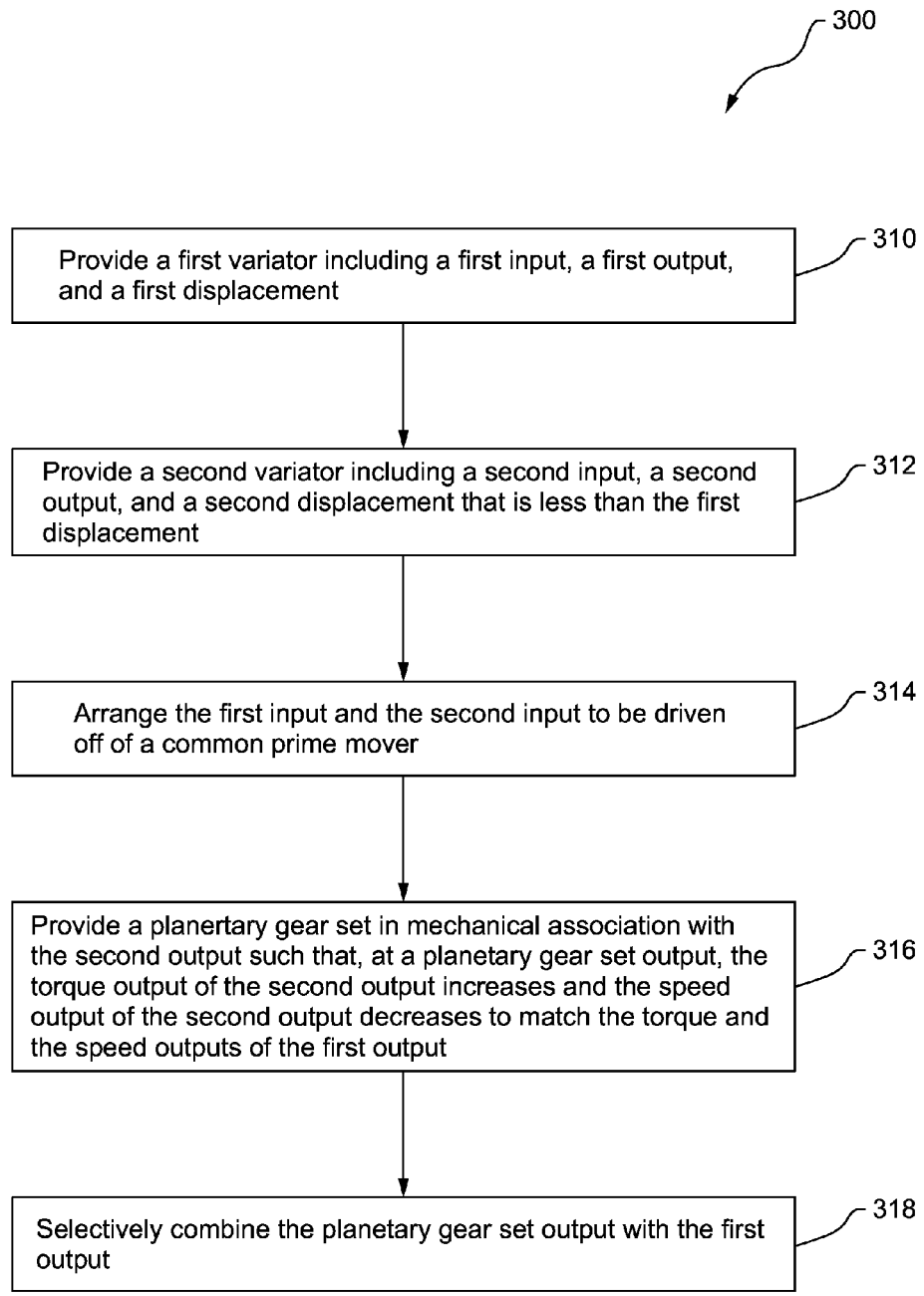
FIG. 3 is a flow chart illustrating a sample sequence of steps which may be practiced in accordance with the teaching of the present disclosure.

FIG. 3 illustrates a flowchart 300 of a sample sequence of steps which may be performed to match torque and speed outputs of two different sized variators in a transmission. Box 310 shows the step of providing a first variator 34 including a first input 66, a first output 68, and a first displacement. Another step, as illustrated in box 312, may be providing a second variator 36 including a second input 70, a second output 72, and a second displacement that is less than the first displacement. Box 314 depicts the step of arranging the first input 66 and the second input 70 to be driven off of a common prime mover 24. As depicted in box 316, another step may be providing a planetary gear set 60 in mechanical association with the second output 72 such that, at a planetary gear set output, the torque output of the second output 72 increases and the speed output of the second output 72 decreases to match the torque and the speed outputs of the first output 68, respectively. Yet another step, as shown in box 318, may be selectively combining the planetary gear set output with the first output 68. Another step may be arranging the second output 72 in mechanical association with a ring gear 74 of the planetary gear set 60. A further step may be arranging a carrier 80 of the planetary gear set in mechanical association with the first output 68. Yet another step may be arranging a sun gear 76 of the planetary gear set 60 to be selectively coupleable to a ground 82 via a clutch 84. The first variator 34 may include a first hydraulic pump 38 in mechanical association with a first hydraulic motor 40 and the second variator 36 may include a second hydraulic pump 42 in mechanical association with a second hydraulic motor 44.

INDUSTRIAL APPLICABILITY

Based on the foregoing, it can be seen that the present disclosure sets forth systems and methods for combining the outputs of two different sized variators in a transmission. For example, in some traditional applications requiring high power, a continuously variable transmission may necessitate multiple variators. In such applications, however, the multiple variators traditionally have the same displacement with no reduction between the variators and without a means to declutch the variators from each other. Moreover, often times, the multiple variator of the same size includes more size than will be needed by the particular high power application, and thus, contributes to unneeded transmission size and costs. The teachings of this disclosure, on the other hand, can be employed to combine the output of a first variator with the output of a second variator that has a smaller displacement than the first variator thereby reducing transmission size and costs.

In operation, the first variator 34 is driven off the transmission input 30 such that the first variator output 68 has a first torque and a first speed. Similarly, the second variator 36 is driven off the transmission input 30 such that the second variator output 72 has a second torque and a second speed. The first planetary gear set 60 increases the second torque of the second variator output 72 and reduces the second speed of the second variator output 72 to match the first torque and first speed of the first variator 34 on the first variator output 68, respectively. With the clutch 84 engaged, the first sun gear 76 is coupled to the ground 82 so that the output from the first carrier 80 is combined with the first variator output 68.

When the clutch 84 is disengaged, the second variator output 72 is disconnected from the first variator output 68. In particular, with the clutch 84 disengaged, the first sun gear 76 is uncoupled from the ground 82 and spins freely so that the second torque of the second variator output 72 is prevented from being transferred to or combined with the first torque of the first variator output 68. As such, in low power applications of the transmission 28, the clutch 84 may be disengaged so that only the first variator 34 is implemented thereby increasing transmission efficiency.

What is claimed is:

1. A transmission for a work machine, the transmission comprising:
    a transmission input;
    a first variator including a first input, a first output, and a first displacement, the first input geared to the transmission input;
    a second variator including a second input, a second output, and a second displacement, the second input geared to the transmission input, the first displacement being greater than the second displacement;
    a first planetary gear set in mechanical association with the second output, the first planetary gear set selectively coupled to a ground, the first planetary gear set in mechanical association with a first gear;
    a second planetary gear set geared to the transmission input;
    a third planetary gear set in mechanical association with the second planetary gear set, the third planetary gear set including a transmission output; and
    a second gear in mechanical association with the third planetary gear set, the second gear in mesh with a third gear, the third gear in mechanical association with the first output, the second gear in mesh with the first gear.

2. The transmission of claim 1, wherein the first variator includes a first hydraulic pump in mechanical association with a first hydraulic motor and the second variator includes a second hydraulic pump in mechanical association with a second hydraulic motor.

3. The transmission of claim 1, wherein the first planetary gear set includes a first ring gear, a first sun gear, and a first at least one planet gear coupled to a first carrier, the second planetary gear set includes a second ring gear, a second sun gear, and a second at least one planet gear coupled to a second carrier, the third planetary gear set includes a third ring gear, a third sun gear, and a third at least one planet gear coupled to a third carrier, the second ring gear in mechanical association with the third carrier, the second sun gear in mechanical association with the third sun gear.

4. The transmission of claim 2, wherein the first and second hydraulic pumps are variable displacement pumps and the first and second hydraulic motors are one of fixed displacement motors and variable displacement motors.

5. The transmission of claim 3, wherein the transmission output includes an output of the third carrier and an output of the third sun gear.

6. The transmission of claim 3, wherein the second gear is in mechanical association with the third ring gear.

7. The transmission of claim 6, wherein the first carrier is in mechanical association with the first gear, the first gear meshes with the second gear.

8. A work machine, the machine comprising:
    a prime mover;
    a transmission input in mechanical association with the prime mover;
    a first variator including a first input, a first output, and a first displacement, the first input geared to the transmission input;
    a second variator including a second input, a second output, and a second displacement, the second input geared to the transmission input, the first displacement being greater than the second displacement;
    a first planetary gear set in mechanical association with the second output, the first planetary gear set selectively coupled to a ground, the first planetary gear set in mechanical association with a first gear;
    a second planetary gear set geared to the transmission input;
    a third planetary gear set in mechanical association with the second planetary gear set, the third planetary gear set including a transmission output; and
    a second gear in mechanical association with the third planetary gear set, the second gear in mesh with a third gear, the third gear in mechanical association with the first output, the second gear in mesh with the first gear.

9. The machine of claim 8, wherein the work machine is one of a wheel loader, a motor grader, and an agricultural tractor.

10. The machine of claim 8, wherein the first variator includes a first hydraulic pump in mechanical association with a first hydraulic motor and the second variator includes a second hydraulic pump in mechanical association with a second hydraulic motor.

11. The machine of claim 8, wherein the first planetary gear set includes a first ring gear, a first sun gear, and a first at least one planet gear coupled to a first carrier, the second planetary gear set includes a second ring gear, a second sun gear, and a second at least one planet gear coupled to a second carrier, the third planetary gear set includes a third ring gear, a third sun gear, and a third at least one planet gear coupled to a third carrier, the second ring gear in mechanical association with the third carrier, the second sun gear in mechanical association with the third sun gear.

12. The machine of claim 10, wherein the first and second hydraulic pumps are variable displacement pumps and the first and second hydraulic motors are one of fixed displacement motors and variable displacement motors.

13. The machine of claim 11, wherein the transmission output includes an output of the third carrier and an output of the third sun gear.

14. The machine of claim 11, wherein the second gear is in mechanical association with the third ring gear.

15. The machine of claim 14, wherein the first carrier is in mechanical association with the first gear, the first gear meshes with the second gear.

16. A method for matching torque and speed outputs of two different sized variators in a transmission, the method comprising:
    providing a first variator including a first input, a first output, and a first displacement;
    providing a second variator including a second input, a second output, and a second displacement that is less than the first displacement;
    arranging the first input and the second input to be driven off of a common prime mover;
    providing a planetary gear set in mechanical association with the second output such that, at a planetary gear set output, the torque output of the second output increases and the speed output of the second output decreases to match the torque and the speed outputs of the first output; and selectively combining the planetary gear set output with the first output.

17. The method of claim 16, wherein the step of providing a planetary gear set further includes arranging the second output in mechanical association with a ring gear of the planetary gear set.

18. The method of claim 17, wherein the step of selectively combining the planetary gear set output with the first output further includes arranging a carrier of the planetary gear set in mechanical association with the first output.

19. The method of claim 18, further including the step of arranging a sun gear of the planetary gear set to be selectively coupleable to a ground via a clutch.

20. The method of claim 16, wherein the first variator includes a first hydraulic pump in mechanical association with a first hydraulic motor and the second variator includes a second hydraulic pump in mechanical association with a second hydraulic motor.

\* \* \* \* \*